(No Model.)
T. SUCHLAND.
CLUTCH FOR HOLDING DISKS.
No. 427,930.
Patented May 13, 1890.
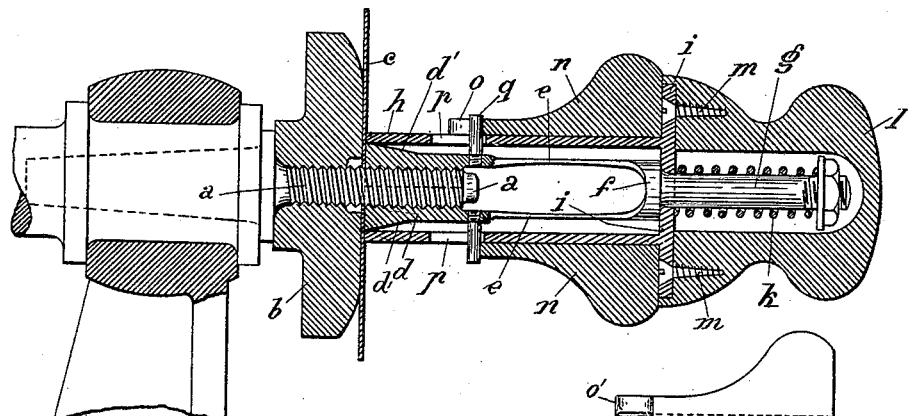
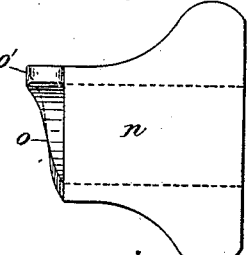
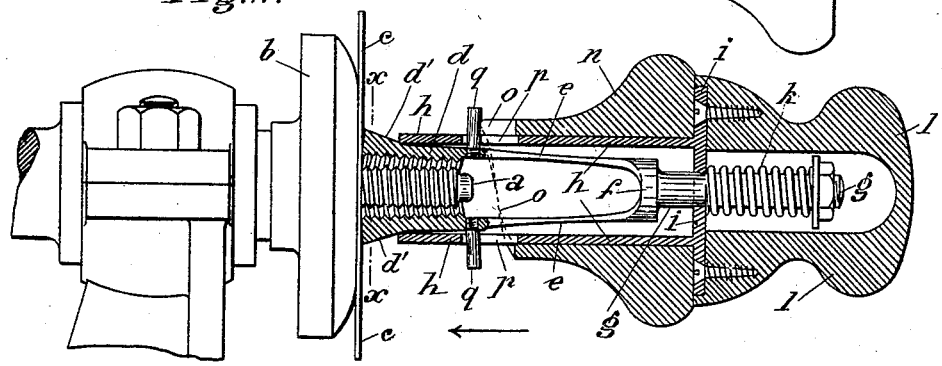
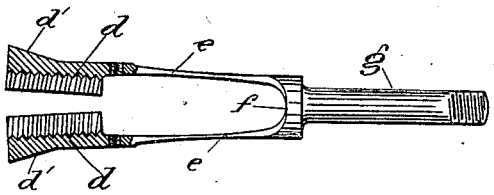
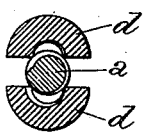
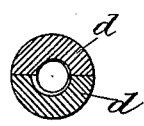
Witnesses:
H. deVos
E. L. Richards
Inventor:
Theodor Suchland,
By Richards
Attorneys.

UNITED STATES PATENT OFFICE.

THEODOR SUCHLAND, OF BERLIN, GERMANY.

CLUTCH FOR HOLDING DISKS.

SPECIFICATION forming part of Letters Patent No. 427,930, dated May 13, 1890.

Application filed January 9, 1890. Serial No. 336,366. (No model.)

*To all whom it may concern:*

Be it known that I, THEODOR SUCHLAND, of the city of Berlin, in the German Empire, have invented a certain new and Improved Expanding Clutch for Fixing Metallic Disks to and Releasing from Patterns in Lathes, of which the following is a specification.

My invention relates to an improved expanding clutch for fixing metallic disks to and releasing them from patterns in lathes. The hitherto customary attachments possess the disadvantage that in order to release the same and remove the metal operated on from the pattern or form, the lathe must be stopped, and, when the lathe is driven by motive power, the attaching-nut must be removed from the mandrel by turning the same to the left. If, on the other hand, the lathe is driven by means of a treadle, the removal of the attaching-nut is still more inconvenient for the workman, for the reason that in order to save time he must reverse the rotation of the lathe, grasp the nut with the hand, and turn it from the threads on the mandrel. In order to attach a new disk or piece of metal to be operated on to the mandrel by means of the attaching-nut the lathe must be rotated to the right, whereby not only a great loss of time ensues, but the workman is fatigued. When my improved expanding clutch is employed, the lathe can be continuously rotated in the same direction. The above-named disadvantages are not only entirely overcome, but the production of the pressed articles is enormously increased.

In the accompanying drawings, Figure 1 is a longitudinal section of my improved expanding clutch in fixed condition and screwed against the metal to be operated on. Fig. 2 is a longitudinal section of my improved clutch in opened condition and ready for removal. Fig. 3 is an elevation of the muff $n$, with the inclined surface $o$ for releasing the grip of the clutch on the screw-bolt or mandrel. Fig. 4 is a representation of the clutch-jaws partly in side view and partly in section. Fig. 5 is a vertical section on the line $x\,x$ in Fig. 2, with open clutch. Fig. 6 is a like section with the clutch-jaws closed.

The form or pattern $b$ is, as usual, screwed to the mandrel $b$ on the front end of the shaft $a$ of the lathe, and in front of this is fixed the work-piece $c$ to be operated on, which is held firmly in position by the expanding clutch.

My improved expanding clutch is constructed as follows: The clutch for holding the work-piece in position consists of two or more jaws $d$, provided with appropriate female threads which gear into the male threads on the mandrel, the jaws forming in closed condition a nut and their ends forming leaf-springs $e$, joined at their rear ends to form a collar $f$, and ending in a stem $g$, provided at its extreme end with screw-threads for receiving a washer and nut, or nut and jam-nut. The forward ends of the jaws $d$ are provided at $d'$ with inclined surfaces, and the leaf-springs $e$ have the tendency to push the jaws of the nut-like clutch outward, so that the clutch can be readily pulled off the mandrel $a$, Fig. 2. The clutch $d\,e\,g$ is arranged in a cylinder $h$, with a broad head $i$ at its rear end, while the forward end is open and comes in contact with the work-piece, and in closed condition retains the jaws of the clutch in snug gear with the threads on the mandrel. The head $i$ is provided with a central boring to allow the free passage of the stem $g$, which is embraced between the rear surface of the head $i$ and the washer on said stem by a helical spring $k$, which has the tendency to draw the jaws of the expanding clutch to the rear and within the cylinder $h$. A handle $l$, hollowed out to receive the stem $g$ and spring $k$, is screwed or otherwise attached to the head $i$ of the cylinder $h$. The drawings represent the attachment by means of screws $m$. Surrounding the cylinder $h$, and rotatable on the same, is a muff $n$, of desired form and size, which lies at the rear end on the flange of the head $i$ of the cylinder $h$. The forward surface of the muff $n$ forms an incline $o$, which gears with one or more pins or screw-pegs $q$, screwed or otherwise fixed to the parts of the clutch and running through longitudinal slots $p$ of the cylinder $h$.

In working with my improved expanding clutch the same is screwed onto the mandrel $a$ in the customary manner until the front edge or surface of the jaws $d$, which are held in snug contact with each other by the cylinder $h$, so that they have the form of a nut, press the work-piece firmly against the mold or pattern $b$.

When the press or other work is finished, the same and also the clutch attachment can be readily removed from the mandrel $a$ without stopping the lathe or reversing the movement of the same. In order to effect the aforesaid operation, the workman grasps the loose muff $n$ and presses at the same time slightly in the direction of the arrow, Fig. 2, thus preventing the muff from rotating. The jaws $d$ and cylinder $h$ continuing their rotary movement will cause one of the pins or pegs $q$ attached to the jaws $d$ to run up the incline $o$ of the muff $n$, so as to release the jaws $d$ from their gear with the threads of the mandrel $a$, said jaws being extended under the influence of the springs $e$, so that the clutch attachment can be readily withdrawn from the mandrel $a$, Fig. 2. The spring $k$, which was put under tension when the jaws $d$ were extended beyond the surface of the cylinder $h$, will, when the pin or peg $q$ has passed the highest part $o'$ of the incline $o$, draw the jaws to the rear within the cylinder $h$, so that they are again in snug contact, so as to form a nut, ready to be again screwed onto the mandrel.

It will be evident to all versed in the art that my improved expanding-clutch attachment can be applied for attaching other than disks to be pressed onto pattern-molds when it is not necessary that the work-piece be fixed between centers, and that other short objects not subject to much vibration can be turned or polished in a lathe and the time saved which is usually occupied in reversing and stopping the lathe.

Having now particularly described and ascertained the nature of my said invention and in what manner the same is to be performed, I declare that what I claim is—

1. The combination of a screw-mandrel, separable jaws threaded to engage the screw and carried by spring supports or legs, a surrounding sleeve for forcing said jaws together, and means for moving the jaws longitudinally away from the mandrel, substantially as set forth.

2. A clutch-like attaching device for work-pieces, consisting of the exteriorly-conical or partially-conical clutch-jaws $d$, divided into two or more parts, the leaf-springs $e$, carrying said jaws, and a guide-rod $g$ for the same, in combination with a cylinder $h$ and a helical spring $k$, for drawing the parts of the clutch $d$ within the cylinder $h$, and a muff $n$, having an inclined surface engaging a projection from said jaws, substantially as set forth.

3. The clutch $d$, consisting of two or more screw-threaded jaws with inclined surfaces $d'$, leaf-springs $e$, carrying said jaws, stem $g$, connected with the jaws, spring $k$, connected with said stem for withdrawing the jaws, and means for engaging said inclined surfaces to force the jaws together, all combined and operating substantially as described and shown.

In witness whereof I have hereunto signed my name in the presence of two subscribing witnesses.

THEODOR SUCHLAND.

Witnesses:
ANTHONY STEFFEN,
FRED. J. DOWNING.